(12) United States Patent
Flores et al.

(10) Patent No.: US 8,836,911 B2
(45) Date of Patent: Sep. 16, 2014

(54) METHOD AND SYSTEM FOR PRODUCING FLAT THREE-DIMENSIONAL IMAGES

(75) Inventors: Eliud Robles Flores, Webster, NY (US); John R. Falvo, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 382 days.

(21) Appl. No.: 13/274,599

(22) Filed: Oct. 17, 2011

(65) Prior Publication Data

US 2013/0094004 A1    Apr. 18, 2013

(51) Int. Cl.
  *G03B 35/14*    (2006.01)
(52) U.S. Cl.
  USPC ............................................ 355/22; 399/121
(58) Field of Classification Search
  USPC ........................................................... 355/22
  See application file for complete search history.

(56) References Cited

U.S. PATENT DOCUMENTS

| | | | |
|---|---|---|---|
| 5,016,055 A | 5/1991 | Pietrowski et al. | |
| 5,282,006 A * | 1/1994 | Fletcher | 399/296 |
| 6,157,804 A | 12/2000 | Richmond et al. | |
| 7,130,126 B1 | 10/2006 | Chung | |
| 8,331,031 B2 * | 12/2012 | Hoffman et al. | 359/621 |
| 2008/0107458 A1 * | 5/2008 | Adams et al. | 399/319 |

* cited by examiner

*Primary Examiner* — Clayton E LaBalle
*Assistant Examiner* — Jas Sanghera
(74) *Attorney, Agent, or Firm* — Tuesday A. Kaasch; Luis M. Ortiz; Kermit D. Lopez

(57) ABSTRACT

A method and system for producing a flat three-dimensional image utilizing acoustic transfer assist. An image is first developed in image bearing material onto the image bearing surface of a rendering device. A three-dimensional plastic sheet can be provided to the transfer section of the rendering device. Transfer of the image can then be accomplished as the plastic sheet comes into contact with the image-bearing surface. The transfer is facilitated by acoustic transfer assist technology associated with the rendering device.

20 Claims, 4 Drawing Sheets

METHOD AND SYSTEM FOR PRODUCING FLAT THREE-DIMENSIONAL IMAGES

TECHNICAL FIELD

Embodiments generally relate to rendering devices and three-dimensional media. Embodiments also relate to the production of flat three-dimensional images. Embodiments further relate to the transfer of image bearing material onto media having uneven topography.

BACKGROUND OF THE INVENTION

Customized printing is a growing market with organizations constantly seeking new and unique ways in which to distinguish their products or message. One such method for drawing attention is by printing an image or message with the appearance of depth or motion known as "flat 3-D". These effects can be accomplished by three-dimensional printing such as lenticular printing. Lenticular printing, however, is a fairly intensive multi-step process that involves the creation of a lenticular image from two or more images and then overlaying the resulting image with semi-cylindrical lenses. The printing and overlaying must be accomplished with significant precision in order to successfully achieve a three-dimensional effect. The creation of lenticular images typically requires specialty printing presses that are adapted to print on sensitive thermoplastic materials, such as lithographic offset printers, and specific ultraviolet-cured inks. Another limitation of lenticular printing is that it can only provide a three-dimensional effect when viewed from limited angles due to the configuration of the lenticular lens.

Advances in media for three-dimensional printing now provide alternatives to lenticular printing for achieving a variety of very unique 3-D effects by printing on different sides of the stock and within layers of the stock. One such media is a plastic sheet that contains an array of convex lenses arranged horizontally and vertically on the top surface such that dimensional images can be seen from every position as described in U.S. Pat. No. 7,130,126, entitled "Three Dimensional Plastic Sheet," which issued to Chung on Oct. 31, 2006 and is incorporated herein by reference in its entirety. Such media can be printed on both the top surface and under layers to create up to five layers of depth. Many conventional means of transfer technology, however, are incapable of printing directly onto the convex lenses of the top side due to the lens topography. This straight into the convex lenses gives an effect we call flat 3-D.

Thus, a need exists for an efficient and cost effective manner of printing three-dimensional images capable of being viewed from any angle or position and any side, including the convex lens side.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method of producing a flat three-dimensional (3-D) image.

It is another aspect of the disclosed embodiments to provide improved image bearing material transfer onto media having uneven topography.

It is another aspect of the disclosed embodiments to provide improved image bearing material transfer onto media under weak electrostatic conditions.

The aforementioned aspects and other objectives and advantages can now be achieved as described herein. A method for producing a flat three-dimensional image is disclosed. An image is first developed in image bearing material onto the image bearing surface of a rendering device. A three-dimensional plastic sheet is then provided to the transfer section of the rendering device. Transfer of the image is then accomplished as the plastic sheet comes into contact with the image bearing surface. The transfer is facilitated by acoustic transfer assist (ATA) technology associated with the rendering device.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
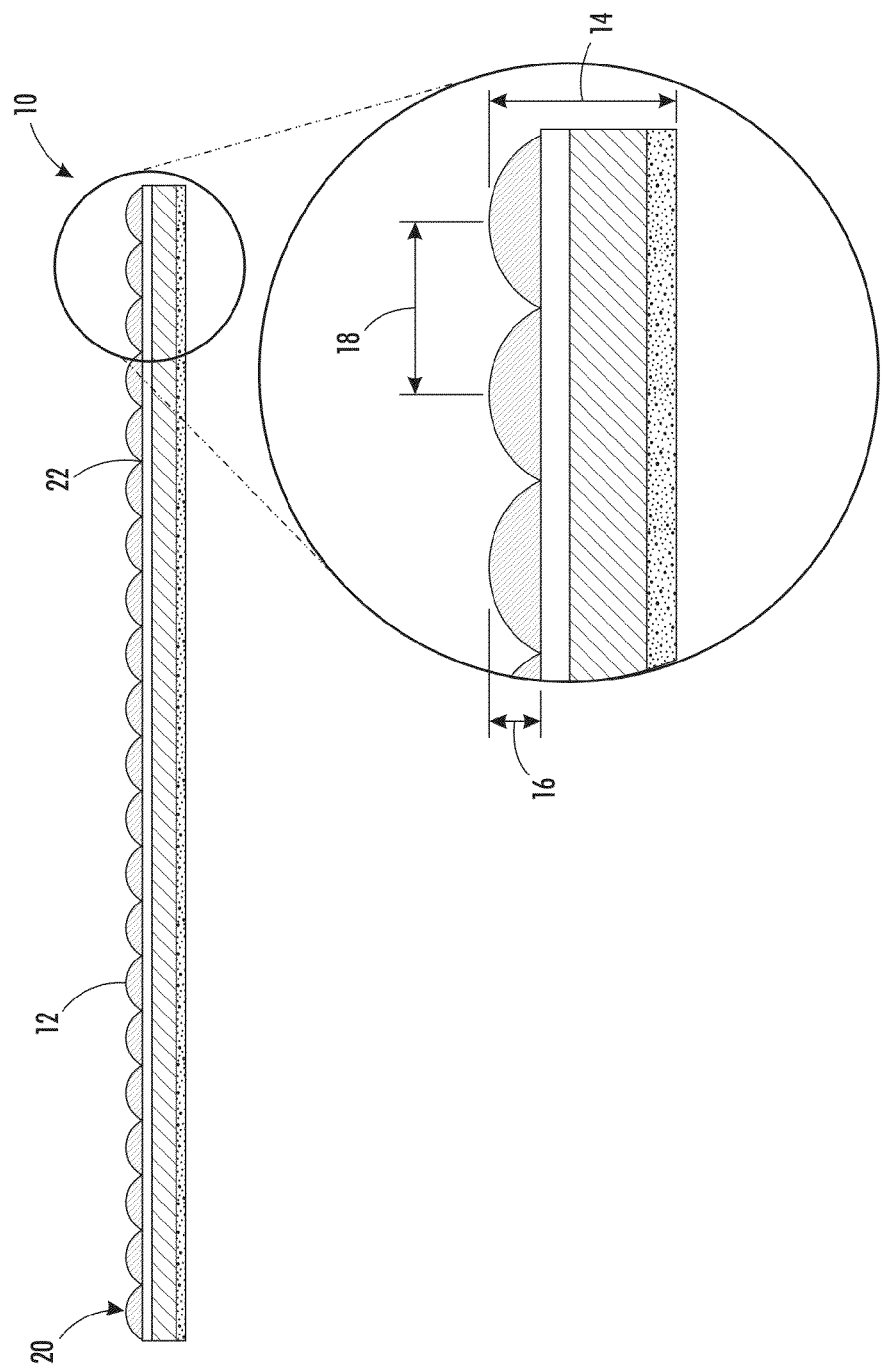
FIG. 1 illustrates a perspective view showing a three-dimensional plastic sheet having a top surface layer of multiple spherical convex lenses, in accordance with the disclosed embodiments.

FIG. 1 illustrates a perspective view of a three-dimensional plastic sheet 10 having a top surface layer of multiple spherical convex lenses 12, in accordance with the disclosed embodiments. The plastic sheet 10 can be further composed of multiple layers of polypropylene. According to one embodiment, the convex lenses 12 can be formed from a transparent synthetic resin. While dimensions of the plastic sheet 10 can vary, typically the plastic sheet 10 has a total thickness 14 of, for example, approximately 0.022 inches, a lens height 16 of approximately 65 um, and lens spacing 18 of approximately 45 um. Note that the disclosed representation of the plastic sheet 10 is not intended to encompass all possible manifestations of the embodiments described herein, but only to provide conceptual examples of possible implementations. The topography of the plastic sheet 10 is such that peaks 20 and valleys 22 are formed by the multiple convex lenses 12. Due to this topography, conventional transfer technology is inadequate for transferring a sufficient amount of toner evenly across the top surface, as required to produce a clear image. Another difficulty in achieving adequate toner transfer onto plastic media, such as the three-dimensional plastic sheet 10, is the electrostatically weak conditions that the plastic media creates.

The aforementioned obstacles can be overcome by utilizing a rendering system capable of imparting vibrations to a photoreceptor, or other image bearing material surface, in order to increase the efficiency of transferring the image bearing material (e.g., toner, etc.) to the target surface. This type of system is generally referred to as "acoustic transfer assist" (ATA). An example of the aforementioned system can be found in U.S. Pat. No. 5,016,055, entitled "Method and Apparatus for Using Vibratory Energy with Application of Transfer Field for Enhanced Transfer in Electrophotographic Imaging," which issued to Pietrowski et al. on May 14, 1991, and is commonly assigned to the Xerox Corporation, and which is incorporated herein by reference in its entirety.

Figure 2:
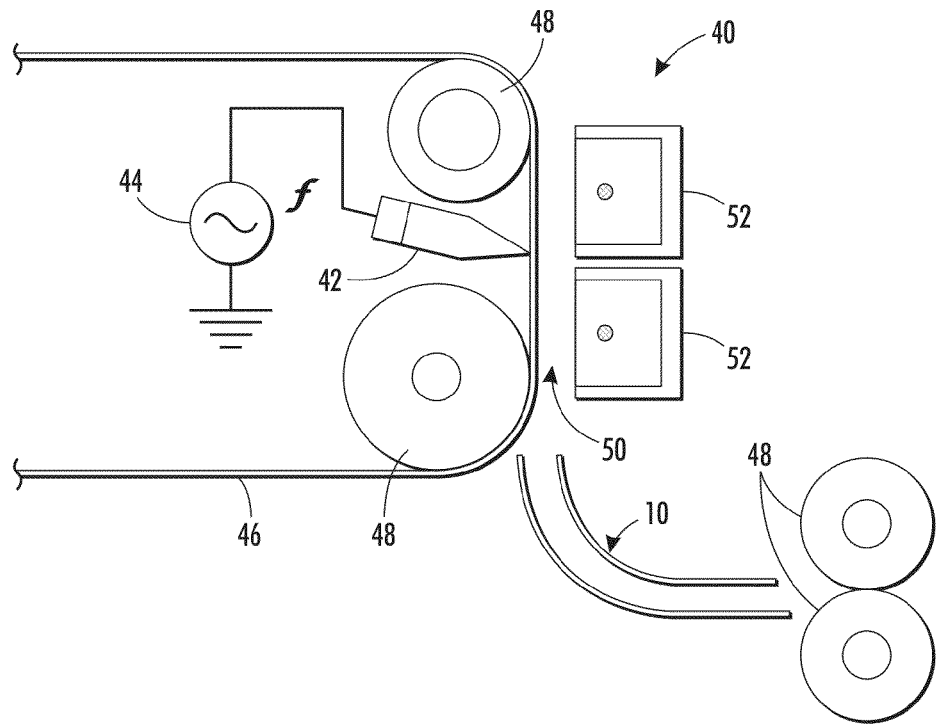
FIG. 2 illustrates a schematic diagram of an exemplary transfer section within a rendering system employing ATA, in accordance with the disclosed embodiments.

FIG. 2 illustrates a schematic diagram of an exemplary transfer section 50 within a rendering device 40 employing ATA. In the configuration depicted in FIG. 2, a relatively high frequency acoustic or ultrasonic resonator 42 driven by a power source 44, and operated at a frequency between 20 kHz and 200 kHz, is shown in vibrating relationship with the image bearing surface 46. Vibration of the image bearing surface 46 agitates the image bearing material 54 (shown in FIG. 4) developed in an image wise configuration onto image bearing surface 46 for mechanical release thereof from image bearing surface 46 at the image transfer section 50, thus allowing image bearing material 54 to be efficiently transferred to a media sheet where the media sheet contains uneven topography or under low electrostatic conditions. Image transfer is also aided by corona generating devices 52 located within the image transfer section 50. Movement of the plastic sheet 10 and image bearing surface is facilitated by a plurality of rollers 48.

Figure 3:
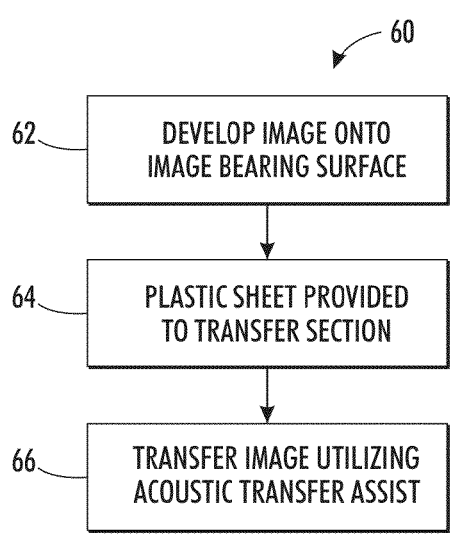
FIG. 3 illustrates a flow chart of operations depicting logical operational steps of a method for producing a flat three-dimensional image, in accordance with the disclosed embodiments.

FIG. 3 illustrates a flow chart of operations depicting logical operational steps of a method 60 to produce an image in the convex lens side of the substrate or what we call flat three-dimensional image. As depicted at block 62, an image can be developed in image bearing material 54 onto the image-bearing surface 46 of a rendering device. Next, as shown at block 64, a three-dimensional plastic sheet 10 can be provided to the transfer section 50. Thereafter, as shown in block 66, transfer of the images can be accomplished as the plastic sheet 10 comes into contact with the image-bearing surface 46 and is facilitated by ATA.

Figure 4:
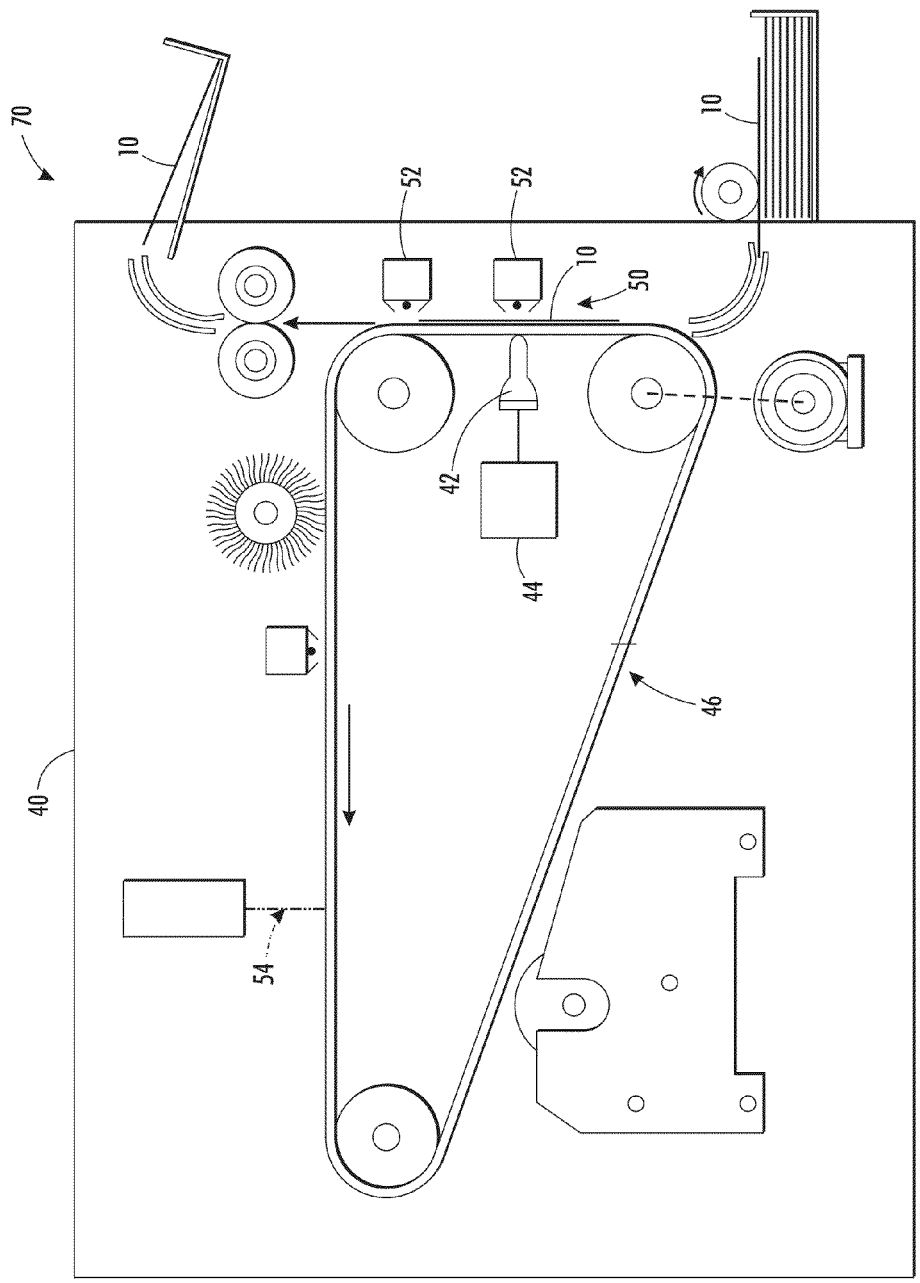
FIG. 4 illustrates a system for producing a flat three-dimensional image, in accordance with the disclosed embodiments.

FIG. 4 illustrates a system 70 for producing a three dimensional image. The system includes a rendering device 40 capable of receiving a three-dimensional plastic sheet 10. Image bearing material 54 is developed onto the image bearing surface 46. The three-dimensional plastic sheet 10 is fed through the transfer section 50 wherein the image bearing material 54 is transferred by ATA onto the three-dimensional plastic sheet 10, thus producing a flat three-dimensional image.

Figure 5A:
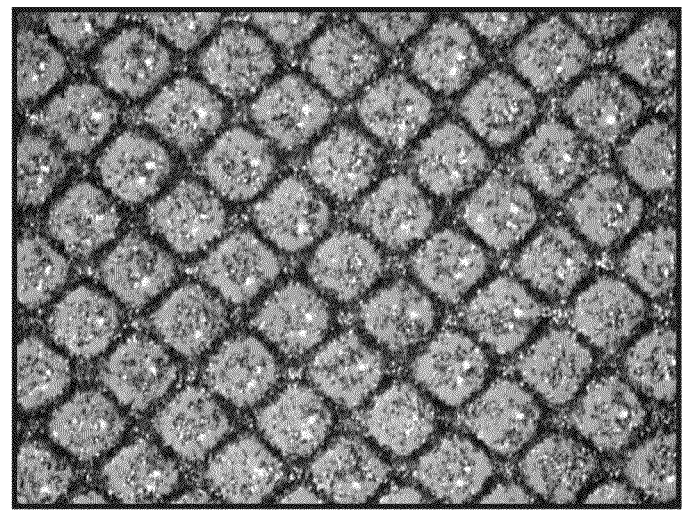
FIGS. 5a and 5b demonstrate the increased toner transfer onto a three-dimensional plastic sheet utilizing the disclosed method.
Figure 5B:
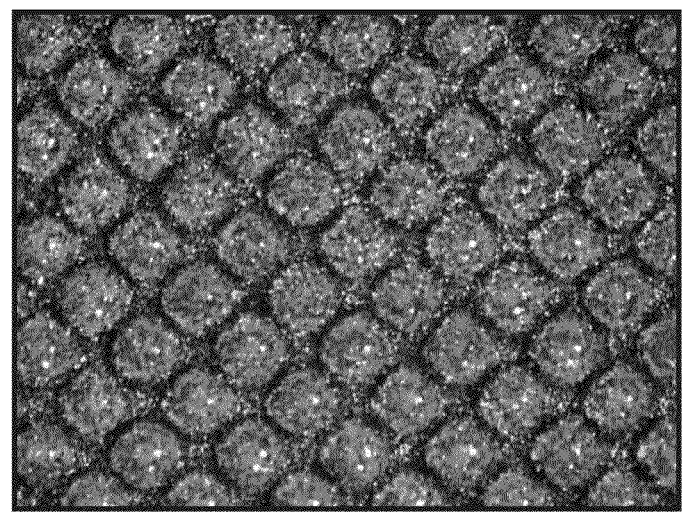

FIGS. 5a and 5b illustrate the improvement in toner transfer onto a three-dimensional plastic sheet 10 using ATA. FIG. 5a depicts the resulting image for image transfer performed without ATA. FIG. 5b shows the improved image transfer performed using ATA, wherein substantially more toner is transferred evenly across the peaks and valleys of the plastic sheet 10.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method of producing a flat three-dimensional image, said method comprising:
    providing to a rendering device, a three-dimensional plastic sheet having a top surface; and
    transferring image bearing material from an image bearing surface onto said top surface of said three-dimensional plastic sheet utilizing acoustic transfer assist aided by a plurality of corona generating devices within a transfer section of said rendering device in order to thereafter create a flat three-dimensional image.

2. The method of claim 1 further comprising configuring said top surface of said three-dimensional plastic sheet to comprise a plurality of spherical convex lenses having a height of at least 60 um.

3. The method of claim 2 further comprising forming said plurality of spherical convex lenses from a transparent synthetic resin.

4. The method of claim 2 further comprising arranging said plurality of spherical convex lenses so as to form peaks and valleys upon said top surface of said three-dimensional plastic sheet.

5. The method of claim 1. further comprising configuring said three-dimensional plastic sheet to comprise layers of polypropylene.

6. The method of claim 5 further comprising configuring said top surface of said three-dimensional plastic sheet to comprise a plurality of spherical convex lenses having a height of at least 60 um.

7. A method for producing a flat three-dimensional image under low electrostatic conditions, said method comprising:
    providing to a rendering device, a three-dimensional plastic sheet having a top surface; and
    transferring image bearing material from an image bearing surface onto said top surface of said three-dimensional plastic sheet under low electrostatic conditions utilizing acoustic transfer assist aided by a plurality of corona generating devices within a transfer section of said rendering device, in order to thereafter create a flat three-dimensional image.

8. The method of claim 7 further comprising configuring said top surface of said three-dimensional plastic sheet to comprise a plurality of spherical convex lenses having a height of at least 60 um.

9. The method of claim 8 further comprising forming said plurality of spherical convex lenses from a transparent synthetic resin.

10. The method of claim 8 further comprising arranging said plurality of spherical convex lenses so as to form peaks and valleys upon said top surface.

11. The method of claim 7 further comprising configuring said three-dimensional plastic sheet to comprise layers of polypropylene.

12. The method of claim 11 further comprising configuring said top surface of said three-dimensional plastic sheet to comprise a plurality of spherical convex lenses having a height of at least 60 um.

13. A system for producing a flat three-dimensional image, said system comprising:
   a rendering device configured to receive a three-dimensional plastic sheet having a top surface, said rendering device comprising a resonator and a plurality of corona generating devices for performing acoustic transfer assist;
   an image bearing surface in contact with said resonator; and
   image bearing material associated with said image bearing surface such that said image bearing material is transferred to said three-dimensional plastic sheet via acoustic transfer assist in order to thereafter create a flat three-dimensional image.

14. The system of claim 13 wherein said top surface of said three-dimensional plastic sheet comprises a plurality of spherical convex lenses having a height of at least 60 um.

15. The system of claim 14 wherein said plurality of spherical convex lenses is configured from a transparent synthetic resin.

16. The system of claim 14 wherein said plurality of spherical convex lenses is arranged so as to form peaks and valleys upon said top surface of said three-dimensional plastic sheet.

17. The system of claim 13 wherein:
   said top surface of said three-dimensional plastic sheet comprises a plurality of spherical convex lenses having a height of at least 60 um; and
   said plurality of spherical convex lenses is configured from a transparent synthetic resin.

18. The system of claim 13 wherein:
   said top surface of said three-dimensional plastic sheet comprises a plurality of spherical convex lenses having a height of at least 60 um; and
   said plurality of spherical convex lenses is arranged so as to form peaks and valleys upon said top surface of said three-dimensional plastic sheet.

19. The system of claim 13 wherein said three-dimensional plastic sheet comprises layers of polypropylene.

20. The method of claim 19 wherein said top surface of said three-dimensional plastic sheet comprises a plurality of spherical convex lenses having a height of at least 60 um.

* * * * *